UNITED STATES PATENT OFFICE.

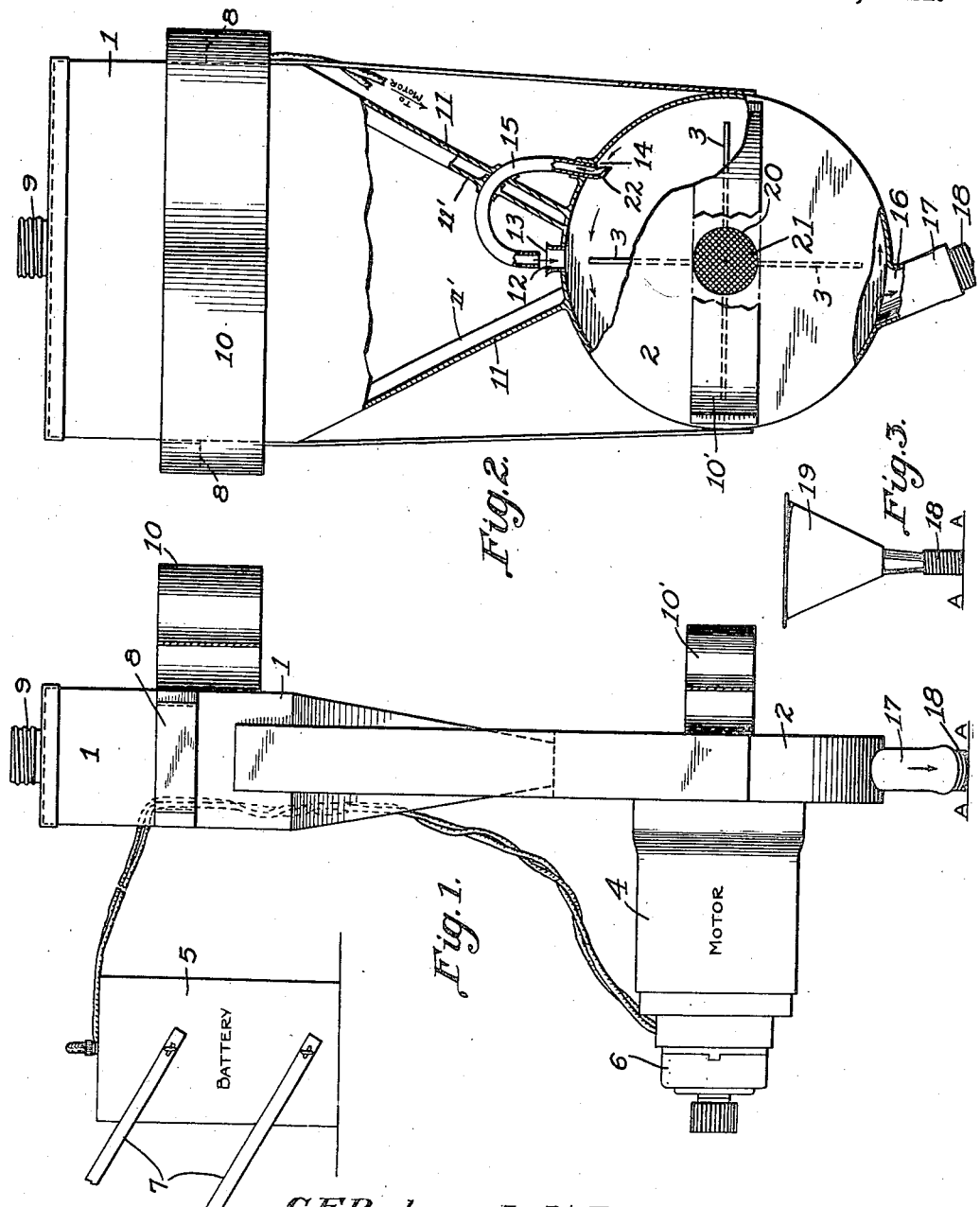

CLAUDE F. REDMON, LILLARD K. REDMON, CLAUDE G. REDMON, AND JOHN T. REDMON, OF PARIS, KENTUCKY, ASSIGNORS OF ONE-FIFTH TO WADE HAMPTON WHITLEY, OF PARIS, KENTUCKY.

POWDER-BLOWER.

1,394,686.      Specification of Letters Patent.      Patented Oct. 25, 1921.

Application filed January 7, 1921. Serial No. 435,711.

*To all whom it may concern:*

Be it known that we, CLAUDE F. REDMON, LILLARD K. REDMON, CLAUDE G. REDMON, and JOHN T. REDMON, citizens of the United States, residing at Paris, in the county of Bourbon and State of Kentucky, have invented certain new and useful Improvements in Powder-Blowers; and we do hereby declare the following to be a full, clear, and exact description of the invention, such as will enable others skilled in the art to which it appertains to make and use the same.

This invention relates to devices for blowing powders and more particularly to portable devices for blowing a powdered insecticide on growing plants. The device is particularly adapted to the treating of cotton bolls in the eradication of the boll weevil.

The object of the invention is to provide an improved device of the character indicated and more particularly to provide an improved feeding device for feeding the powdered insecticide from the container into the blower.

The invention consists in the novel structure, arrangement and combination of parts herein more particularly specified and claimed.

One sheet of drawing accompanies this specification as part thereof in which like reference characters indicate like parts throughout.

Figure 1 is a side elevation partly diagrammatic of applicants' improved device.

Fig. 2 is a front elevation partly in section.

Fig. 3 shows the applying funnel used in connection with the device.

Referring to the drawings the device consists of a powder container 1, a blower casing 2 containing a suitable rotary fan device 3 operated by a motor 4 which is supplied with current from the portable battery 5 and controlled by a switch 6. Straps 7 are provided to support the battery on the back of the operator and suitable supporting straps (not shown) may be secured to the members 8 attached to the side of the container. An opening is provided in the top of the container with a screw cap 9 through which a supply of powdered insecticide can be poured. On the back of the device are provided brace members 10 adapted to rest against the body of the operator to steady the device.

The bottom of the container 1 is constructed with converging walls 11 which may be reinforced and stiffened by ribs 11' and which are connected with the top of the lower or blower casing 2 in which is provided an orifice 12 surrounded by a funnel shaped mouth 13. To one side of the orifice 12 and in advance thereof relative to the direction of rotation of the blower fan a second orifice 14 is provided in the top of the blower casing 2 in which orifice 14 is fitted a tube 15 having a backwardly directed lip 22 within the casing. This tube passes upwardly and through the wall 11 of the container 1 and is thence directed downwardly with its open end over and directly above the funnel-shaped mouth 13. At the bottom of the lower or blower casing 2 is provided a third and larger orifice 16 from which extends in a substantially tangential direction a nozzle 17 to which is connected a flexible tube 18 carrying on its free end an applying funnel 19. In the front of the blower casing 2 and centrally thereof is provided another orifice 20 which is preferably covered with a suitable screen 21 for the admission of air to the blower.

In operation the motor 4 rotates the blower fan 3 in the direction indicated by the arrows in Fig. 2 whereupon air is drawn in through the screened orifice 20 and is driven in the direction indicated by the arrows, a part of the blast of air thus created engaging lip 22 and passing upwardly through tube 15 and thence downwardly through the funnel-shaped mouth 13 and orifice 12 carrying with it a certain amount of the powdered insecticide contained in the container 1. This powder is mixed with the blast of air in rotation and expelled through orifice 16, tube 18 and funnel applying member 19. This funnel applying member 19 is adapted to be held by the operator over the cotton boll or other part of the plant to be treated thus directing the poison ladened air directly to the part of the plant desired.

Having thus described our invention what we claim is:

1. A powder blower comprising a container, a rotary blower in communication with said container, and means for diverting a portion of the blast from said blower into said container to force the contents thereof into the blower.

2. A powder blower comprising in combination a rotary blower having a casing, a container mounted on said casing at the top thereof, said casing having an orifice communicating with said container to permit the passage of the contents of the container into the blower casing, and means for conveying a portion of the blast from said blower and directing the same downwardly through said orifice.

3. In a powder blower having a container and a blower member, a wall separating said container from said blower having an orifice therein, a funnel-shaped mouth for said orifice, and a tube communicating with the blower at a point in advance of said orifice relative to the direction of rotation of the blower and extending into the container, its end being located over and above said funnel-shaped mouth.

4. In a powder blower comprising a container and a rotary blower, means for feeding a powder from said container into said blower, said means comprising a funnel-shaped member interposed between said container and said blower with its larger end within the container and forming a passageway from the container into the blower and a tubular member having one end within the container and fixed over and above the funnel mouth, and means for forcing a stream of air through said tubular member downwardly through said funnel-shaped passage.

5. In a powder blower having a container and a fan casing, a funnel-shaped tube connecting said container and casing with its large mouth in the container, a second tube connecting said container and casing having its end within the casing provided with a lip to divert a portion of the air blast therein, and having its end within the container located over and above said funnel shaped tube to direct said diverted air blast therethrough.

In testimony whereof we affix our signatures.

CLAUDE F. REDMON.
LILLARD K. REDMON.
CLAUDE G. REDMON.
JOHN T. REDMON.